Feb. 26, 1935.  P. E. KLOPSTEG  1,992,219
LINEAR EXPANSION APPARATUS
Filed Sept. 27, 1929
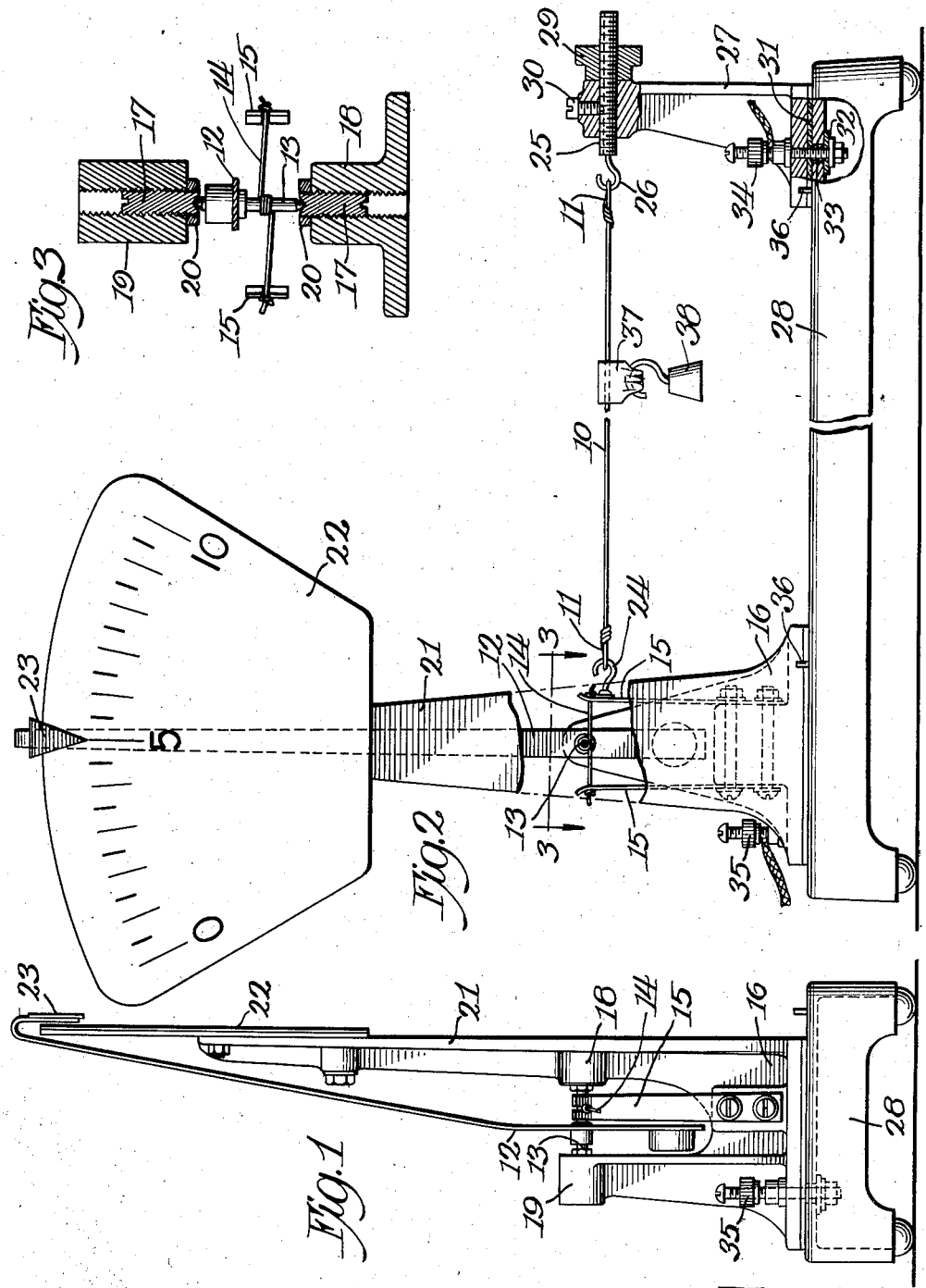
Inventor
Paul E. Klopsteg
By Gillson, Mann & Co. Attys.

Patented Feb. 26, 1935

1,992,219

UNITED STATES PATENT OFFICE 1,992,219

LINEAR EXPANSION APPARATUS

Paul E. Klopsteg, Chicago, Ill., assignor to Central Scientific Company, a corporation of Illinois Application September 27, 1929, Serial No. 395,727

11 Claims. (Cl. 35—12)

This invention relates to linear expansion apparatus, and among other objects, aims to provide apparatus by which the phenomena of thermal expansion and contraction may be studied and visibly demonstrated and coefficients of expansion may be easily determined.

The nature of the invention may be readily understood by reference to one construction embodying the invention and illustrated in the accompanying drawing, in which:

Fig. 1 is a side elevation of the apparatus;

Fig. 2 is a front elevation; and

Fig. 3 is a detail section taken on the line 3—3 of Fig. 2 of the apparatus of the mechanism for effecting a multiplication of the actual expansion of a specimen.

The illustrative apparatus has been designed to effect thermal expansion of specimens of wire and the like by means of an electric current passed through the specimen.

The linear expansion or contraction of the specimen is transmitted to mechanism which multiplies and visibly indicates the degree of expansion or contraction. The specimen is here shown in the form of a wire 10 of any appropriate material such as iron, brass, nickel silver or the like, whose ends have been twisted into loops 11 to provide means for connection with the apparatus.

The multiplying and indicating mechanism is represented by a pointer 12 carried by and fixed to a shaft 13. The specimen is so connected to shaft 13 that it rotates the shaft a peripheral distance equal to the aggregate expansion or contraction of the specimen. In the present case such connection is effected by a flexible element 14 such as a stout cord or the like which is wrapped three or more times around the shaft to provide adequate frictional engagement therewith and is maintained in taut condition by tensioning means in the form of flat springs 15 connected adjacent the respective ends of the element 14. The springs are bolted or otherwise appropriately secured at their opposite ends to the pedestal 16. The shaft 13 is supported in bearings which minimize friction. Such bearings are similar to those employed in delicate measuring apparatus and comprise adjustable screw pins 17 carried in the bearing supports 18 and 19 of the pointer pedestal 16 and into the recessed extremities of which the pointed ends of the shaft 13 project. The bearing is adjusted by screws 17 and such adjustment is maintained by lock nuts 20.

The pedestal 16 is provided with a scale support 21 which in this instance extends vertically and is integral with the front bearing support 18, and scale 22 is appropriately secured to support 21. The graduations on the scale are arbitrary in character though preferably equally spaced; they and the indicating numerals are made sufficiently large to be visible from any point of a large demonstration room. The pointer extends behind the scale and its extremity is bent downwardly from above as at 23 to overlie the graduations on the scale. A hook 24 carried by the inner spring 15 provides means for connecting one end of the specimen to the indicating and multiplying apparatus. The other end of the specimen is advantageously connected to an adjusting screw 25 by appropriate means represented by the hook 26. The adjusting screw is mounted in a pedestal 27 which like the pointer pedestal 16 is bolted or otherwise appropriately secured to the apparatus base 28. The screw is adjusted in or out by a thumb nut 29 and any desired adjustment may be maintained by a set screw 30, which also serves to prevent rotation of the adjusting screw.

For the purpose of electrically insulating the pedestals 16 and 27 from each other and from the base, the base 28 in this case being made of metal, non-conducting washers or shims 31 and 32 are placed on the opposite faces of the base (Fig. 2) and electrically separate the bottom faces of the pedestals and the connecting bolts from the base. A sleeve 33 of insulating material advantageously surrounds that portion of the bolt which passes through the base.

Electric current is passed through the specimen by electric wires connected to binding posts 34 and 35 on the respective pedestals, which in this instance also serve as connecting bolts, thus placing the specimen in series with an appropriate current supply, such as a six volt storage battery.

After a specimen has been connected to the hooks 24 and 26 the nut 29 is turned so as to place some slight tension in the wire. The pointer may be adjusted to zero or any desired point on the scale by momentarily pressing together the two springs 15 to relieve the frictional grip of element 14 upon shaft 13. The scale (which, as stated above, may be arbitrary in character) may be calibrated relative to the actual expansion or contraction of the specimen by observing the displacement of the pointer made by one or more rotations of the adjusting nut 29. To simplify such calibration the adjusting screw 25 is advantageously designed with a pitch of one millimeter. Thus the displacement of the pointer on the scale produced by a single rotation of screw 29 indicates the displacement which would occur for every millimeter of contraction or expansion of the specimen. Having calibrated the scale in this manner the actual expansion or contraction of the specimen may be readily determined.

For convenience in forming the specimen wires of standard length, it is desirable to provide a pair of pins 35 on the base adjacent the pedestals spaced apart a convenient distance within the range of separation of the books 24, 26, as shown in Fig. 2. It is obvious that these pins may be used as a sort of template to form the loops 11 on the specimen wire.

Among other uses, the apparatus affords an excellent means for studying the behavior of a specimen throughout a temperature range. The magnification of the change in length effected by the present apparatus is about one to two hundred. Hence, the movement of the pointer on the scale gives a striking visual demonstration of the changes in length (though microscopic in character) actually taking place under the influence of changes in temperature in the specimen.

To determine the coefficient of linear expansion of a specimen it is necessary to determine the temperature range, in addition to the length of the specimen and the change in length under expansion or contraction. The initial temperature may advantageously be taken as room temperature. Another point in the range of temperatures may be determined by utilization of the known melting temperature of another material. For example, a narrow strip of pure tinfoil 37 (one-half to one millimeter in width) may be hung over the specimen (the specimen being carefully cleaned at this point) and a small weight 38 of one or two grams attached to this strip. When the small weight is heard to drop upon the melting of the portion of the tinfoil in contact with the specimen, the pointer reading is taken and the temperature of the wire at that instant is considered to be that of the melting point of tin, namely, 232° C. The coefficient of expansion $C_e$ may then be determined according to the following formula:

$$C_e = \frac{dL}{(t-t_0)L}$$

in which $dL$ is the change in length of the wire under expansion or contraction as calculated from the initial and final pointer positions by the previously determined calibration; $t$ is the final temperature, in this case 232° C.; $t_0$ the initial or room temperature; and $L$ the length of the specimen.

The apparatus may also advantageously be used to demonstrate certain phenonena taking place during temperature changes such as the decalescence and recalescence points of steel. When the temperature of a steel specimen is raised in the apparatus the pointer will indicate expansion up to the decalescence point at which time (because of the absorption of heat during molecular changes occurring in the wire) expansion momentarily ceases and in fact a slight contraction may be indicated. Upon cooling of the wire from a temperature above the decalescence point, the pointer indicates contraction until the recalescence point is reached, at which time owing to the release of heat (upon a restoration of the initial molecular condition in the specimen), contraction momentarily ceases and in fact some slight expansion may occur before contraction is resumed. Both of the foregoing phenomena are strikingly indicated by the movement of the pointer, and an appreciation of what takes place in the wire (though microscopic in character) may be had from an observation of the action of the pointer.

The apparatus may also be employed to demonstrate the phenomena of a hot wire ammeter. For such use the scale is initially calibrated by connecting an appropriate wire specimen such as brass or nickel silver in series with an ammeter. When so calibrated the apparatus may be used for directly measuring either direct or alternating current of any frequency.

Obviously the invention is not limited to the details of the illustrative construction since these may be variously modified. Moreover, it is not indispensable that all features of the invention be used conjointly, since various features may be advantageously employed in different combinations and sub-combinations.

I claim as my invention:

1. Laboratory expansion apparatus of the character described comprising in combination, means for supporting a flexible specimen of material which expands when heated, means for changing the temperature of the specimen to cause it to expand or contract, a shaft arranged to be connected with and rotated by the expansion and contraction of the specimen, means for multiplying the effect of said rotation to render the movement produced visible to the eye, and a measuring device connected to the specimen for calibrating said multiplying means.

2. Laboratory expansion apparatus of the character described comprising in combination, means for supporting a flexible specimen of material which expands when heated, means for changing the temperature of the specimen to cause it to expand or contract, a shaft arranged to be connected with and rotated by the expansion and contraction of the specimen, means for multiplying the effect of said rotation to render the movement produced visible to the eye, and a screw of known pitch connected with the specimen for moving said wire a known distance to calibrate said multiplying means.

3. Laboratory expansion apparatus of the character described comprising in combination, means for supporting a specimen of material which expands when heated, means for changing the temperature of the specimen to cause it to expand or contract, a shaft of relatively small diameter having a flexible cord wrapped around said shaft and provided with means for connection with the specimen, spring means for maintaining said cord taut to create adequate friction against said shaft, and a device controlled by the shaft for registering the expansive or contractive movements of the specimen, said spring means being constructed and arranged to permit the release of said friction so that the registering may be adjusted to any desired position.

4. Laboratory apparatus for linear expansion and contraction comprising in combination, a fixed and a movable specimen support each provided with means for receiving a specimen adapted to be heated by the passage of an electric current through it and to expand when so heated, a shaft of relatively small diameter having a multiplying pointer connected thereto, a scale associated with said pointer and provided with graduations of a size visible from a substantial distance, a flexible cord wrapped around said shaft and connected to said movable support, releasable means for maintaining the friction of said cord on said shaft, and electrical terminals connected with said supports for passing a heating current through said specimen.

5. Laboratory apparatus for linear expansion and contraction comprising in combination a fixed and a movable specimen support each provided with means for receiving a specimen adapted to be heated by the passage of an electric current through it and to expand when so heated, a shaft of relatively small diameter having a multiplying pointer connected thereto, a scale associated with said pointer and provided with graduations of a size visible from a substantial distance, a flexible cord wrapped around said shaft and connected to said movable support, releasable means for maintaining the friction of said cord on said shaft, a calibrating screw associated with said supports for producing a known linear movement of said specimen for calibrating said scale, and electrical terminals connected with said supports for passing a heating current through said specimen.

6. In apparatus for studying the linear expansion of a specimen of heat-expansible material provided in a form adapted to be heated by conduction of an electric current, a base, an adjustable support for the specimen mounted adjacent one end of the base, a second support for the specimen mounted adjacent the other end of the base and electrically insulated from the first support, means for passing an electric current through the specimen, and means associated with the second support for visibly indicating the expansion or contraction of the specimen.

7. In apparatus for studying the linear expansion of a specimen of heat-expansible material provided in a form adapted to be heated by conduction of an electric current, an elongated base, specimen supports mounted adjacent the two ends of the base and electrically insulated therefrom, means for passing an electric current through the specimen, and multiplying means associated with one of the supports for visibly indicating change in the linear dimension of the specimen.

8. The method of demonstrating the linear expansion of a specimen of material adapted to expand when heated which includes taking a specimen of known length in a form adapted to be heated by conducting an electric current, supporting the specimen between a relatively fixed and a relatively movable point, hanging on the specimen a small mass of substance of known melting point lower than that of the specimen and suspending a weight from said substance, passing an electric current through the specimen of sufficient strength to melt the substance by heat conducted from the specimen, whereby the increase in length of the specimen at the instant the weight falls due to the melting of the substance may be observed.

9. The method of demonstrating the linear expansion of a specimen of material adapted to expand when heated which includes taking a specimen of known length in a form adapted to be heated by conducting an electric current, supporting the specimen between a relatively fixed and a relatively movable point, hanging on the specimen a small mass of substance of known melting point lower than that of the specimen and suspending a weight from said substance, passing an electric current through the specimen of sufficient strength to melt the substance by heat conducted from the specimen, magnifying the change in position of the movable point so that it is readily visible to the eye, whereby the increase in length of the specimen at the instant the weight falls due to the melting of the substance may be observed.

10. In apparatus of the class described, a base, a pair of pedestals mounted on the base adapted to support under tension and in horizontal position a flexible specimen adapted to expand when heated, a calibrating device associated with one of the pedestals and a linear expansion indicating device associated with the other pedestal.

11. In apparatus of the class described, a base, a pair of pedestals spaced from each other mounted on the base and adapted to support under tension between them a flexible specimen adapted to expand when heated, and means associated with one of the pedestals for visibly indicating a change in the length of the specimen.

PAUL E. KLOPSTEG.